United States Patent
Yuan

(10) Patent No.: US 8,533,425 B1
(45) Date of Patent: Sep. 10, 2013

(54) AGE BASED MISS REPLAY SYSTEM AND METHOD

(75) Inventor: Lingfeng Yuan, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 535 days.

(21) Appl. No.: 11/591,856

(22) Filed: Nov. 1, 2006

(51) Int. Cl.
*G06F 12/00* (2006.01)

(52) U.S. Cl.
USPC .................. 711/206; 711/133; 711/E12.061; 711/E12.072

(58) Field of Classification Search
None
See application file for complete search history.

(56) References Cited

U.S. PATENT DOCUMENTS

| | | |
|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,949,785 A | 9/1999 | Beasley |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 * | 12/2002 | Hill et al. ..................... 711/158 |
| 6,549,997 B2 | 4/2003 | Kalyanasundharam |
| 6,636,223 B1 | 10/2003 | Morein |
| 6,658,538 B2 | 12/2003 | Arimilli et al. |
| 6,742,104 B2 | 5/2004 | Chauvel et al. |
| 6,813,699 B1 | 11/2004 | Belgard |
| 6,823,433 B1 | 11/2004 | Barnes et al. |
| 6,839,813 B2 | 1/2005 | Chauvel |
| 6,859,208 B1 | 2/2005 | White |
| 6,877,077 B2 | 4/2005 | McGee et al. |
| 6,883,079 B1 | 4/2005 | Priborsky |
| 7,007,075 B1 | 2/2006 | Coffey |

(Continued)

FOREIGN PATENT DOCUMENTS

| | | |
|---|---|---|
| JP | 02288927 | 11/1990 |
| JP | 03054660 | 3/1991 |
| JP | 04182858 | 6/1992 |

OTHER PUBLICATIONS

Final OA Dated Jun 4, 2009; U.S. Appl. No. 11/586,756.

(Continued)

*Primary Examiner* — Shawn X Gu

(57) ABSTRACT

A shared resource management system and method are described. In one embodiment, a shared resource management system facilitates age based miss replay. In one exemplary implementation, a shared resource management system includes a plurality of engines, and a shared resource a shared resource management unit. The plurality of engines perform processing. The shared resource supports the processing. The shared resource management unit handles multiple outstanding miss requests.

19 Claims, 8 Drawing Sheets

(56) References Cited

U.S. PATENT DOCUMENTS

| | | | |
|---|---|---|---|
| 7,082,508 B2 | 7/2006 | Khan et al. | |
| 7,107,411 B2 | 9/2006 | Burton et al. | |
| 7,107,441 B2 | 9/2006 | Zimmer et al. | |
| 7,120,715 B2 * | 10/2006 | Chauvel et al. | 710/244 |
| 7,159,095 B2 | 1/2007 | Dale et al. | |
| 7,194,597 B2 | 3/2007 | Willis et al. | |
| 7,234,038 B1 | 6/2007 | Durrant | |
| 7,275,246 B1 | 9/2007 | Yates, Jr. et al. | |
| 7,401,358 B1 | 7/2008 | Christie et al. | |
| 7,447,869 B2 | 11/2008 | Kruger et al. | |
| 7,519,781 B1 | 4/2009 | Wilt | |
| 7,545,382 B1 | 6/2009 | Montrym et al. | |
| 2002/0004823 A1 | 1/2002 | Anderson et al. | |
| 2002/0013889 A1 | 1/2002 | Schuster et al. | |
| 2002/0169938 A1 | 11/2002 | Scott et al. | |
| 2002/0172199 A1 | 11/2002 | Scott et al. | |
| 2003/0014609 A1 | 1/2003 | Kissell | |
| 2003/0167420 A1 | 9/2003 | Parsons | |
| 2003/0196066 A1 | 10/2003 | Mathews | |
| 2003/0236771 A1 | 12/2003 | Becker | |
| 2004/0025161 A1 | 2/2004 | Chauvel et al. | |
| 2004/0054833 A1 | 3/2004 | Seal et al. | |
| 2004/0078778 A1 | 4/2004 | Leymann et al. | |
| 2004/0153350 A1 | 8/2004 | Kim et al. | |
| 2004/0193831 A1 | 9/2004 | Moyer | |
| 2004/0215918 A1 | 10/2004 | Jacobs et al. | |
| 2004/0268071 A1 | 12/2004 | Khan et al. | |
| 2005/0050013 A1 | 3/2005 | Ferlitsch | |
| 2005/0097280 A1 | 5/2005 | Hofstee et al. | |
| 2005/0268067 A1 | 12/2005 | Lee et al. | |
| 2006/0004984 A1 | 1/2006 | Morris et al. | |
| 2006/0069879 A1 | 3/2006 | Inoue et al. | |
| 2006/0069899 A1 | 3/2006 | Schoinas et al. | |
| 2006/0187945 A1 | 8/2006 | Andersen | |
| 2006/0195683 A1 | 8/2006 | Kissell | |
| 2006/0230223 A1 * | 10/2006 | Kruger et al. | 711/6 |
| 2006/0259732 A1 | 11/2006 | Traut et al. | |
| 2006/0259825 A1 | 11/2006 | Cruickshank et al. | |
| 2006/0282645 A1 | 12/2006 | Tsien | |
| 2006/0288174 A1 | 12/2006 | Nace et al. | |
| 2007/0067505 A1 | 3/2007 | Kaniyur et al. | |
| 2007/0073996 A1 | 3/2007 | Kruger et al. | |
| 2007/0106874 A1 | 5/2007 | Pan et al. | |
| 2007/0126756 A1 | 6/2007 | Glasco et al. | |
| 2007/0157001 A1 | 7/2007 | Ritzau | |
| 2007/0168634 A1 | 7/2007 | Morishita et al. | |
| 2007/0168643 A1 | 7/2007 | Hummel et al. | |
| 2008/0263284 A1 | 10/2008 | da Silva et al. | |

OTHER PUBLICATIONS

Non-Final OA Dated Aug. 19, 2009; U.S. Appl. No. 11/591,857.
Non-Final OA Dated Nov. 13, 2008; U.S. Appl. No. 11/588,177.
Notice of Allowance; Mail Date Dec. 14, 2009; U.S. Appl. No. 11/586,826.
Non Final Office Action; Mail Date Mar. 17, 2010; U.S. Appl. No. 11/592,819.
Harper et al., (Rapid recovery from transient Faults in the fault tolerant processor with fault-tolerant shared memory); Aug. 1990, IEEE, p. 350-359.
Chaudhuri, "The impact of NACKs in shared memory scientific applications", Feb. 2004, IEEE, IEEE Transactions on Parallel and distributed systems vol. 15, No. 2, pp. 134-150.
Laibinis, "Formal Development of Reactive Fault Tolerant Systems", Sep. 9, 2005, Springer, Second International Workshop, RISE 2005, pp. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Office Action U.S. Appl. No. 11/591,685, dated May 24, 2010.
Office Action U.S. Appl. No. 11/591,685, dated Oct. 27, 2010.
Restriction U.S. Appl. No. 11/592,076, dated Apr. 28, 2009.
Notice of Allowance U.S. Appl. No. 11/592,076, dated Jan. 29, 2010.
Notice of Allowance U.S. Appl. No. 11/592,076, dated May 4, 2010.
Notice of Allowance U.S. Appl. No. 11/592,076, dated Aug. 13, 2010.
Notice of Allowance U.S. Appl. No. 11/592,076, dated Nov. 26, 2010.
Restriction U.S. Appl. No. 12/650,068, dated Aug. 10, 2010.
Office Action U.S. Appl. No. 11/523,830, dated Mar. 16, 2010.
Notice of Allowance U.S. Appl. No. 11/523,830, dated Jun. 28, 2010.
Notice of Allowance U.S. Appl. No. 11/523,830, dated Sep. 2, 2010.
Notice of Allowance U.S. Appl. No. 11/523,830, dated Jan. 20, 2011.
Office Action U.S. Appl. No. 11/586,756, dated Aug. 3, 2010.
Notice of Allowance U.S. Appl. No. 11/586,756, dated Dec. 27, 2010.
Restriction U.S. Appl. No. 11/591,857, dated Apr. 27, 2009.
Office Action U.S. Appl. No. 11/591,857, dated Dec. 7, 2010.
Office Action U.S. Appl. No. 11/592,106, dated Jun. 25, 2010.
Office Action U.S. Appl. No. 11/592,106, dated Dec. 16, 2010.
Office Action U.S. Appl. No. 11/523,926, dated Sep. 19, 2008.
Office Action U.S. Appl. No. 11/523,926, dated Apr. 10, 2009.
Office Action U.S. Appl. No. 11/523,926, dated Oct. 1, 2009.
Notice of Allowance U.S. Appl. No. 11/523,926, dated Mar. 29, 2010.
Notice of Allowance U.S. Appl. No. 11/523,926, dated Jul. 9, 2010.
Notice of Allowance U.S. Appl. No. 11/523,926, dated Oct. 27, 2010.
Notice of Allowance U.S. Appl. No. 11/523,950, dated Jul. 21, 2010.
Notice of Allowance U.S. Appl. No. 11/523,950, dated Nov. 3, 2010.
Notice of Allowance U.S. Appl. No. 11/586,826, dated Jun. 22, 2009.
Notice of Allowance U.S. Appl. No. 11/586,826, dated Dec. 14, 2009.
Notice of Allowance U.S. Appl. No. 11/592,819, dated Oct. 16, 2009.
Office Action U.S. Appl. No. 11/592,819, dated Mar. 17, 2010.
Notice of Allowance U.S. Appl. No. 11/592,819, dated Nov. 23, 2010.
Office Action U.S. Appl. No. 11/591,629, dated May 27, 2010.
Office Action U.S. Appl. No. 11/591,629, dated Nov. 3, 2010.
Office Action U.S. Appl. No. 11/592,780, dated Apr. 28, 2010.
Office Action U.S. Appl. No. 11/592,780, dated Oct. 13, 2010.
Office Action U.S. Appl. No. 11/586,825, dated Feb. 22, 2010.
Notice of Allowance U.S. Appl. No. 11/586,825, dated Aug. 16, 2010.
Notice of Allowance U.S. Appl. No. 11/586,825, dated Nov. 26, 2010.
Osronline, (The Basics: So what is a page fault?) May 2003, p. 1-2.
Final Office Action; Mail Date Nov. 20, 2009; U.S. Appl. No. 11/591,685.
Non-Final OA Dated May 28, 2009; U.S. Appl. No. 11/523,830.
Non-Final OA Dated Sep. 15, 2008; U.S. Appl. No. 11/523,830.
Non-Final OA Dated Jan. 20, 2010; U.S. Appl. No. 11/586,756.
Final OA Dated Jun. 4, 2009; U.S. Appl. No. 11/586,756.
Non-Final OA Dated Nov. 18, 2008; U.S. Appl. No. 11/586,756.
Non Final OA Dated Aug. 19, 2009; U.S. Appl. No. 11/591,857.
Restriction Requirement Dated Apr. 27, 2009; U.S. Appl. No. 11/591,857.
Restriction Requirement; Mail Date Apr. 28, 2009; U.S. Appl. No. 11/592,076.
Non-Final OA Dated Oct. 29, 2008; U.S. Appl. No. 11/523,950.
Notice of Allowance Dated Apr. 24, 2009; U.S. Appl. No. 11/523,950.
Notice of Allowance Dated Sep. 3, 2009; U.S. Appl. No. 11/523,950.
Notice of Allowance Dated Dec. 24, 2009; U.S. Appl. No. 11/523,950.
Non-Final OA Dated Dec. 16, 2008; U.S. Appl. No. 11/586,826.
Non-Final OA Dated Feb. 17, 2009; U.S. Appl. No. 11/592,819.
Final OA Dated Nov. 9, 2009; U.S. Appl. No. 11/591,629.
Non-Final OA Dated Feb. 20, 2009; U.S. Appl. No. 11/591,629.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non Final OA Dated Nov. 13, 2008; U.S. Appl. No. 11/588,177.
Final Office Action, Dated Nov. 23, 2009; U.S. Appl. No. 11/592,106.
Non Final Office Action, Dated Apr. 1, 2009; U.S. Appl. No. 11/592,106.
Final OA Dated Oct. 14, 2009; U.S. Appl. No. 11/586,825.
Non-Final OA Dated Mar. 18, 2009; U.S. Appl. No. 11/586,825.

Non Final Office Action; Mail Date Apr. 27, 2009; U.S. Appl. No. 11/591,685.
Notice of Allowance; Mail Date Jan. 29, 2010; U.S. Appl. No. 11/592,076.
Final Office Action; Mail Date Mar. 16, 2010; U.S. Appl. No. 11/523,830.
Restriction Requirement; Mail Date Apr. 27, 2009; U.S. Appl. No. 11/591,857.
Notice of Allowance; Mail Date Jun. 22, 2009; U.S. Appl. No. 11/586,826.
Norice of Allowance; Mail Date Dec. 14, 2009, U.S. Appl. No. 11/586,826.
Non Final Office Action, Mail Date Mar. 17, 2010; U.S. Appl. No. 11/592,819.
Notice of Allowance; Mail Date Jan. 19, 2010; U.S. Appl. No. 11/592,819.
Non Final Office Action; Mail Date Feb. 22, 2010; U.S. Appl. No. 11/586,825.
Non Final Office Action; Mail Date Aug. 19, 2009; U.S. Appl. No. 11/592,076.
Wikipedia, (Page Fault definition) Wikipedia, pp. 1-4 ; Mar. 2009.
PCMAG (Definition of: Page fault) PCMag, 1 Page; Mar. 2009.
Harper et al., (Rapid recovery from transient Faults in the fault tolerant processor with fault-tolerant shared memory); Aug. 1990, IEEE, pp. 350-359.
Ooi, (Fault Tolerant Architecture in a cache memory control LSI), IEEE, pp. 507-514; Apr. 1992.
Oracle, (Oracle 8i Parallel server), 1999, Oracle, Release 2 (8.1.6) 1-216; Dec. 1999.
Shalan. (Dynamic Memory Management for embedded real-time multiprocessor system on a chip), ACM. pp. 180-186; Nov. 2000.
Shalan. (Dynamic Memory Management for embedded real-time multiprocessor system on a chip), Georgia Inst. Of Tech. 1-118; Nov. 2003.
Notice of Allowance Dated May 5, 2011; U.S. Appl. No. 11/523,830.
Notice of Allowance Dated May 12, 2011; U.S. Appl. No. 11/586,756.
Final Office Action Dated Apr. 27, 2010; U.S. Appl. No. 11/588,177.
Notice of Allowance Dated Mar. 4, 2011; U.S. Appl. No. 11/586,825.
Non-Final Office Action, Mailed May 6, 2011; U.S. Appl. No. 11/591,685.
Notice of Allowance, Mailed Mar. 17, 2011; U.S. Appl. No. 11/592,076.
Notice of Allowance, Mailed Jun. 29, 2011; U.S. Appl. No. 11/592,076.
Non-Final Office Action, Mailed Feb. 1, 2011; U.S. Appl. No. 12/650,068.
Non-Final Office Action, Mailed Aug. 9, 2011; U.S. Appl. No. 12/650,068.
Notice of Allowance, Mailed Jul. 21, 2011; U.S. Appl. No. 11/523,830.
Notice of Allowance, Mailed Aug. 25, 2011; U.S. Appl. No. 11/586,756.
Final Office Action, Mailed May 4, 2010; U.S. Appl. No. 11/591,857.
Notice of Allowance, Mailed Mar. 18, 2011; U.S. Appl. No. 11/591,857.
Notice of Allowance, Mailed Jul. 21, 2011; U.S. Appl. No. 11/591,857.
Final Office Action, Mailed Jul. 5, 2011; U.S. Appl. No. 11/592,106.
Notice of Allowance, Mailed Feb. 3, 2011; U.S. Appl. No. 11/523,926.
Notice of Allowance, Mailed May 23, 2011; U.S. Appl. No. 11/523,926.
Notice of Allowance, Mailed Aug. 23, 2011; U.S. Appl. No. 11/523,926.
Notice of Allowance, Mailed Jun. 9, 2011; U.S. Appl. No. 11/523,950.
Notice of Allowance, Mailed Aug. 30, 2011; U.S. Appl. No. 11/523,950.
Notice of Allowance, Mailed Feb. 16, 2011; U.S. Appl. No. 11/586,826.
Notice of Allowance, Mailed Jul. 26, 2011; U.S. Appl. No. 11/586,826.
Notice of Allowance, Mailed Apr. 19, 2011; U.S. Appl. No. 11/592,819.
Notice of Allowance, Mailed Sep. 7, 2011; U.S. Appl. No. 11/592,819.
Final Office Action, Mailed Jun. 8, 2011; U.S. Appl. No. 11/591,629.
Final Office Action, Mailed Apr. 12, 2011; U.S. Appl. No. 11/592,780.
Non-Final Office Action, Mailed Jun. 7, 2011; U.S. Appl. No. 11/588,177.
Notice of Allowance, Mailed Jun. 16, 2011; U.S. Appl. No. 11/586,825.
Notice of Allowance, Mailed Aug. 9, 2011; U.S. Appl. No. 11/586,825.
Final Office Action, Mailed Nov. 16, 2011; U.S. Appl. No. 11/591,685.
Notice of Allowance, Mailed Oct. 14, 2011; U.S. Appl. No. 11/592,076.
Non-Final Office Action, Mailed Nov. 16, 2011; U.S. Appl. No. 12/650,068.
Notice of Allowance, Mailed Jan. 13, 2012; U.S. Appl. No. 11/586,756.
Notice of Allowance, Mailed Oct. 28, 2011; U.S. Appl. No. 11/591,857.
Final Office Action, Mailed Dec. 2, 2011; U.S. Appl. No. 11/592,106.
Notice of Allowance, Mailed Oct. 28, 2011; U.S. Appl. No. 11/523,926.
Notice of Allowance, Mailed Nov. 14, 2011; U.S. Appl. No. 11/523,950.
Notice of Allowance, Mailed Dec. 27, 2011; U.S. Appl. No. 11/586,826.
Notice of Allowance, Mailed Dec. 9, 2011; U.S. Appl. No. 11/592,819.
Non-Final Office Action, Mailed Nov. 1, 2011; U.S. Appl. No. 11/592,780.
Final Office Action, Mailed Nov. 29, 2011; U.S. Appl. No. 11/588,177.
Guelfi et al., (Rapid Integration of Software Engineering Techniques) 2005, Second International Workshop, 9 pages.
Notice of Allowance, Mailed Feb. 22, 2012; U.S. Appl. No. 11/591,685.
Notice of Allowance, Mailed Jan. 27, 2012; U.S. Appl. No. 11/592,076.
Notice of Allowance, Mailed Oct. 26, 2011; U.S. Appl. No. 11/523,830.
Notice of Allowance, Mailed Feb. 2, 2012; U.S. Appl. No. 11/523,830.
Notice of Allowance, Mailed Feb. 10, 2012; U.S. Appl. No. 11/591,857.
Notice of Allowance, Mailed Feb. 24, 2012; U.S. Appl. No. 11/523,926.
Notice of Allowance, Mailed Dec. 8, 2011; U.S. Appl. No. 11/586,825.
Notice of Allowance, Mailed Mar. 21, 2012; U.S. Appl. No. 11/586,825.
Notice of Allowance Dated May 30, 2012; Appl. No. 11/591,685.
Notice of Allowance Dated May 1, 2012; U.S. Appl. No. 12/650,068.
Notice of Allowance Dated Jul. 6, 2012; U.S. Appl. No. 12/650,068.
Notice of Allowance Dated May 10, 2012; U.S. Appl. No. 11/523,830.
Notice of Allowance Dated May 15, 2012; U.S. Appl. No. 11/586,756.
Notice of Allowance Dated May 25, 2012; U.S. Appl. No. 11/591,857.
Final Office Action Dated May 10, 2012; U.S. Appl. No. 11/592,106.
Notice of Allowance Dated Jun. 1, 2012; U.S. Appl. No. 11/523,926.
Notice of Allowance Dated Jul. 5, 2012; U.S. Appl. No. 11/586,826.
Notice of Allowance Dated Jun. 7, 2012; U.S. Appl. No. 11/592,819.
Final Office Action Dated May 7, 2012; U.S. Appl. No. 11/592,780.
Notice of Allowance Dated Jul. 6, 2012; U.S. Appl. No. 11/586,825.
Notice of Allowance Dated May 10, 2012; U.S. Appl. No. 11/592,076.
Notice of Allowance Dated Sep. 26, 2012; U.S. Appl. No. 11/591,685.

Notice of Allowance Dated Aug. 16, 2012; U.S. Appl. No. 11/592,076.
Notice of Allowance Dated Sep. 17, 2012; U.S. Appl. No. 12/650,068.
Notice of Allowance Dated Aug. 29, 2012; U.S. Appl. No. 11/523,830.
Notice of Allowance Dated Nov. 20, 2012; U.S. Appl. No. 11/586,756.
Notice of Allowance Dated Sep. 18, 2012; U.S. Appl. No. 11/591,857.
Notice of Allowance Dated Sep. 12, 2012; U.S. Appl. No. 11/523,926.
Notice of Allowance Dated Oct. 5, 2012; U.S. Appl. No. 11/592,819.
Non-Final Office Action Dated Sep. 14, 2012; U.S. Appl. No. 11/591,629.
Notice of Allowance Dated Sep. 14, 2012; U.S. Appl. No. 11/588,177.
Notice of Allowance Dated Oct. 12, 2012; U.S. Appl. No. 11/586,825.
Wikipedia, (CPU Cache Definition), www.wikipedia.com, pp. 1-16, Jan. 26, 2010.
Notice of Allowance Dated Jan. 14, 2013; U.S. Appl. No. 11/591,685, filed Nov. 1, 2006.
Non-Final Office Action Dated Aug. 19, 2009; U.S. Appl. No. 11/592,076, filed Nov. 1, 2016.
Notice of Allowance Dated Jan. 28, 2013; U.S. Appl. No. 12/650,068, filed Dec. 30, 2009.
Notice of Allowance Dated May 15, 2012; U.S. Appl. No. 11/586,756, filed Oct. 24, 2006.
Notice of Allowance Dated Feb. 20, 2013; U.S. Appl. No. 11/586,756, filed Oct. 24, 2006.
Notice of Allowance Dated Dec. 31, 2012; U.S. Appl. No. 11/591,857, filed Nov. 1, 2006.
Notice of Allowance Dated Feb. 1, 2013; U.S. Appl. No. 11/591,857, filed Nov. 1, 2006.
Non-Final Office Action Dated Jan. 3, 2013; U.S. Appl. No. 11/592,106, filed Nov. 1, 2006.
Notice of Allowance Dated Apr. 2, 2013; U.S. Appl. No. 11/523,950, filed Sep. 19, 2006.
Notice of Allowance Dated Feb. 7, 2013; U.S. Appl. No. 11/586,826, filed Oct. 24, 2006.
Notice of Allowance Dated Jan. 24, 2013; U.S. Appl. No. 11/592,819, filed Nov. 2, 2006.
Notice of Allowance Dated Mar. 7, 2013; U.S. Appl. No. 11/591,629, filed Nov. 1, 2006.
Notice of Allowance Dated Mar. 18, 2013; U.S. Appl. No. 11/588,177, filed Oct. 24, 2006.
Notice of Allowance Dated May 8, 2013; U.S. Appl. No. 11/591,685, filed Nov. 1, 2006.
Notice of Allowance Dated May 10, 2013; U.S. Appl. No. 12/650,068, filed Dec. 30, 2009.
Notice of Allowance Dated May 23, 2013; U.S. Appl. No. 11/591,857, filed Nov. 1, 2006.
Final Office Action Dated Jun. 6, 2013; U.S. Appl. No. 11/592,106, filed Nov. 1, 2006.
Notice of Allowance Dated May 16, 2013; U.S. Appl. No. 111523,950, filed Sep. 19, 2006.
Notice of Allowance Dated May 8, 2013; U.S. Appl. No. 111592,819, filed Nov. 2, 2006.

* cited by examiner

US 8,533,425 B1

AGE BASED MISS REPLAY SYSTEM AND METHOD

FIELD OF THE INVENTION

The present invention relates to the field of information processing. In particular, the present invention relates to a system and method for shared resource access management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Electronic systems providing these advantageous results often include shared resources. However, designing and building systems that efficiently access and utilize a shared resource is often challenging. Coordinating the access to shared resources can be highly complex and resource intensive.

Memory or storage is usually a very important component of a number of systems. Memories typically store information utilized by a system in performance of a number of different tasks. Other components of a system typically request access to a memory in order to retrieve (e.g., "read") information from or forward (e.g., "write') information to the memory. Different types of memories (e.g., bulk storage, main memory, removable memory etc.) and or memory "spaces" (e.g., virtual, physical, etc.) can be utilized to support information storage.

Different types of memory can potentially offer different features. For example, different types of memories typically have different relative storage capacities and relatively different access speeds. Traditionally, systems that have relatively large storage capacity have relatively slow access speeds and systems that have relatively fast access speeds have relatively small storage capacities. For example, main system memories are relatively fast compared to bulk storage memories but typically store less information. A number of systems transfer chunks of information between relatively fast small memories and relatively slow bulk memories in an attempt to optimize speed and capacity.

Traditional computer systems also often run programs that utilize virtual memory space addressing. Typically the computer system performs a translation or mapping between the virtual memory space addressing and physical memory space addressing. However, errors or faults can occur during the translation or mapping between virtual memory space addressing and physical memory space addressing. For example, when performing virtual to physical memory space translation a fault can occur when a translation map or a physical page is not resident. Faults or errors in storing information can cause problems for continued proper operation and/or accurate results.

SUMMARY

A shared resource management system and method are described. In one embodiment, a shared resource management system facilitates age based miss replay. In one exemplary implementation, a shared resource management system includes a plurality of engines, and a shared resource and a shared resource management unit. The plurality of engines perform processing. The shared resource supports the processing. The shared resource management unit handles multiple outstanding hit, miss, and miss under miss requests.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
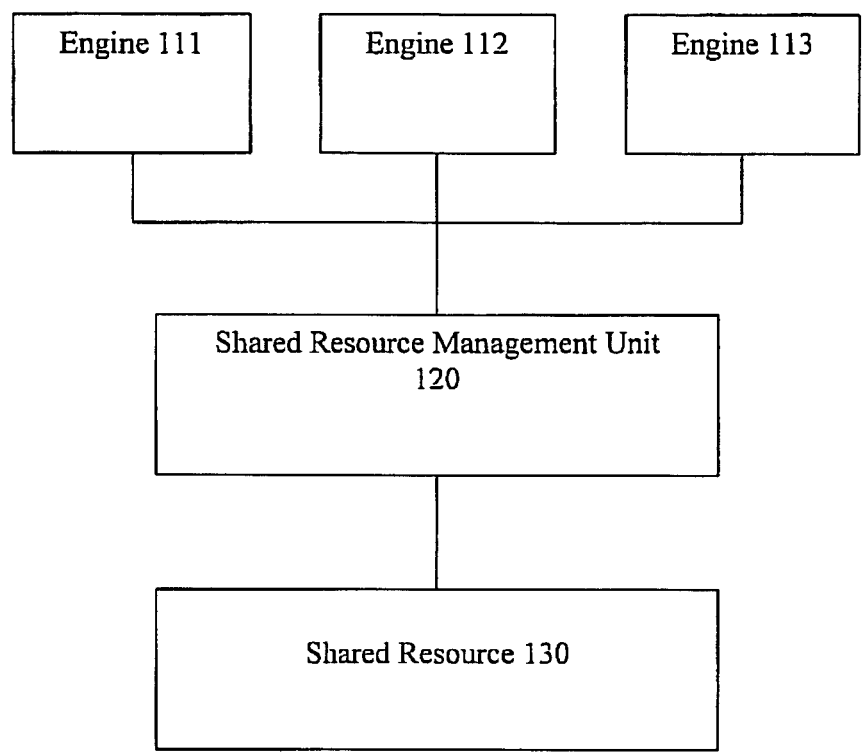
FIG. 1 is a block diagram of an exemplary shared resource management system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a block diagram of an exemplary shared resource management system 100 in accordance with one embodiment of the present invention. Exemplary shared resource management system 100 includes engine 111, engine 112, engine 113, shared resource management unit 120 and shared resource 130. Engine 111, engine 112, and engine 113 are communicatively coupled to shared resource management unit 120 which in turn is communicatively coupled to shared resource 130.

The components of exemplary shared resource management system 100 cooperatively operate to facilitate efficient management of access to a shared resource by a plurality of engines. Engine 111, engine 112 and engine 113 perform various processing activities. In one embodiment, each engine can perform processing activities for a variety of clients. Shared resource 130 supports the processing by engines 111, 112 and 113. In one exemplary implementation, shared resource 130 is a memory for storing information utilized by engines 111, 112, and/or 113. Shared resource management unit 120 independently controls access to the shared resource 130. In one embodiment, shared resource 130 is a memory and shared resource management unit 120 is a memory management unit. Shared resource management unit 120 handles multiple outstanding hits, misses, and miss under miss requests.

Figure 2A:
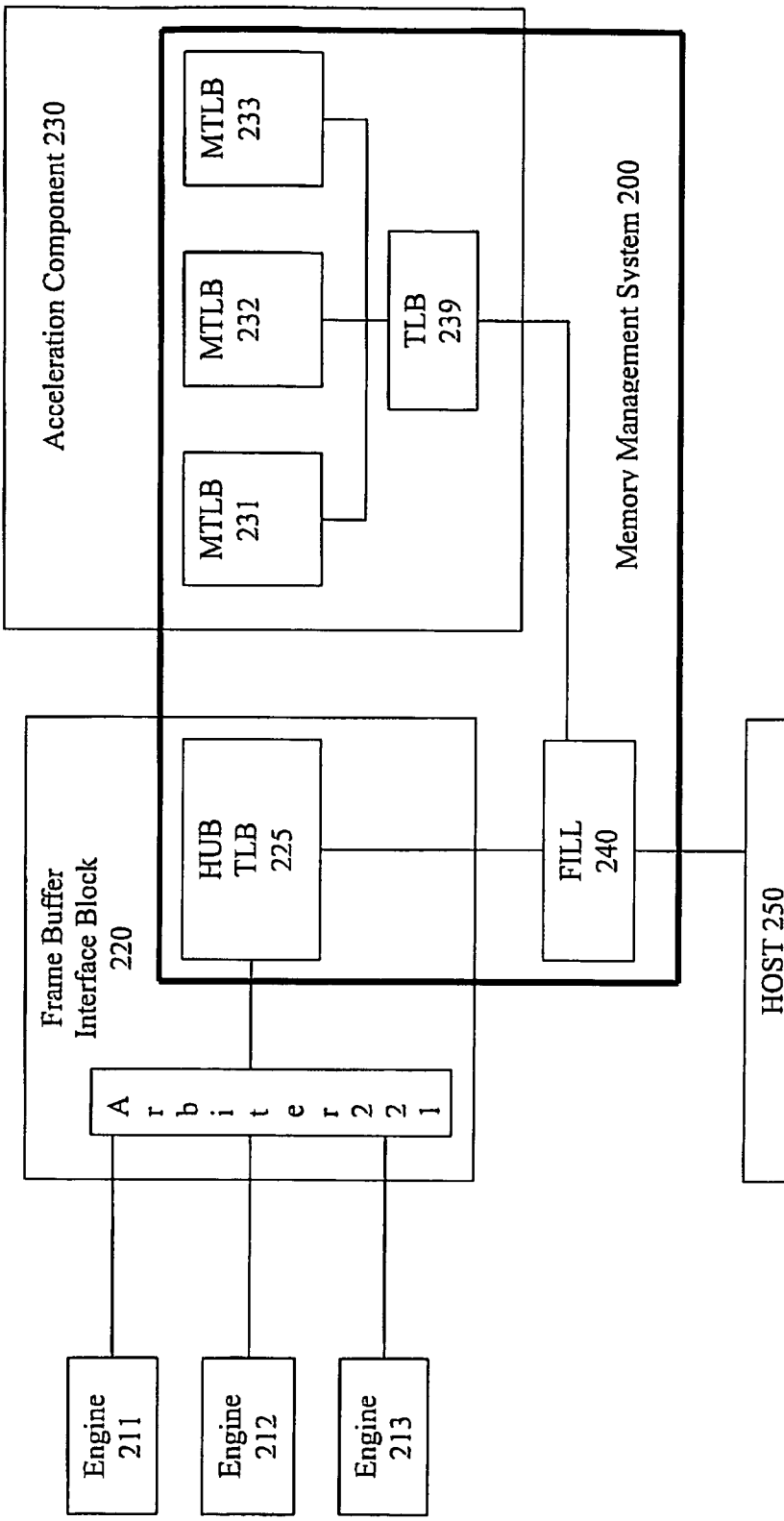
FIG. 2A is a block diagram of an exemplary memory management system in accordance with one embodiment of the present invention.

FIG. 2A is a block diagram of exemplary memory management system 200, in accordance with one embodiment of the present invention. In one exemplary implementation, memory management system 200 is referred to as a memory management unit (MMU). Memory management system 200 facilitates efficient memory access. Memory management system 200 includes shared translation buffers (e.g., hub translation buffer TLB 225 and TLB 239), dedicated micro translation buffers (e.g., TLBs 231, 232 and 233) and fill component 240. Shared translation buffers and dedicated micro translation buffers translate virtual addresses to physical addresses. Fill component 240 coordinates translation lookaside buffer invalidation and fetches page table entry information for the translation lookaside buffers (e.g., on TLB misses). If there is a miss in the translation (e.g., information is not stored in a current cache location) a notification is sent to the fill component 240. The fill component 240 puts together a memory request packet and forwards it to a frame buffer to retrieve translation data. In one embodiment, the fill component 240 can put together memory request packets associated with page table entries for translating between virtual and physical memory spaces.

In one embodiment, memory management unit 200 handles multiple outstanding hits, misses, and miss under miss requests. The memory management unit services the multiple outstanding hits, misses, and miss under miss requests in accordance with the order in which they are serviceable and received. In one embodiment, a translation lookaside buffer component assigns ages to the memory access requests including hits, initial misses, and miss under miss. The ages correspond to the order in which the hits, misses, and miss under miss memory access requests are received. In one exemplary implementation, the memory management unit tags each request with an age when it is received. In one embodiment, a request can have a priority field and serviceable requests with the highest priority go out first even though the age may not be the oldest.

In one embodiment, a memory management unit tracks hits, misses and miss under misses in queues. Multiple hits, misses and miss under miss requests in each respective queue are replayable together. The memory management unit compares the age of serviceable requests and services the oldest. The memory management unit performs the age comparison of requests at the head of respective queues. In one embodiment a comparison of serviceable hits, misses and miss under miss queues is performed. In one embodiment, the memory management unit forwards fill requests while performing subsequent comparisons. It is appreciated the memory management unit can facilitate contiguous page coalescing.

In one embodiment, memory management system 200 is included in a graphics system. The graphics system includes engine 211, engine 212, and engine 213, buffer interface block 220, acceleration component 230, fill component 240 and host 250. In one embodiment, the acceleration component 230 is dedicated to serving the graphics engine. Engine 211, engine 212, and engine 213, are communicatively coupled to frame buffer interface block 220, which is communicatively coupled to fill component 240. Fill component 240 in turn is communicatively coupled to acceleration component 230 and host 250.

The components of the graphics system cooperatively operate to perform graphics processing memory accesses. Engines 211, 212 and 213 process graphics information. Frame buffer interface block 220 enables efficient and independent access to a frame buffer. Arbiter 221 selectively arbitrates access requests from engines 211, 212, and 213 and forwards selected access requests to Hub TLB 225. Hub TLB 225 translates between virtual addresses and physical addresses. Acceleration component 230 enables accelerated processing of graphics information. In one embodiment, MTLBs 231, 232 and 233 handle translations between virtual and physical memory spaces in a level 1 cache and TLB 239 handles memory translations between virtual and physical memory spaces in a level 2 cache. Fill component 240 coordinates retrieval of translation data, including fetching page table entry information for translation lookaside buffers as set forth above. Host 250 issues interrupts including interrupts for handling memory access faults.

Figure 2B:
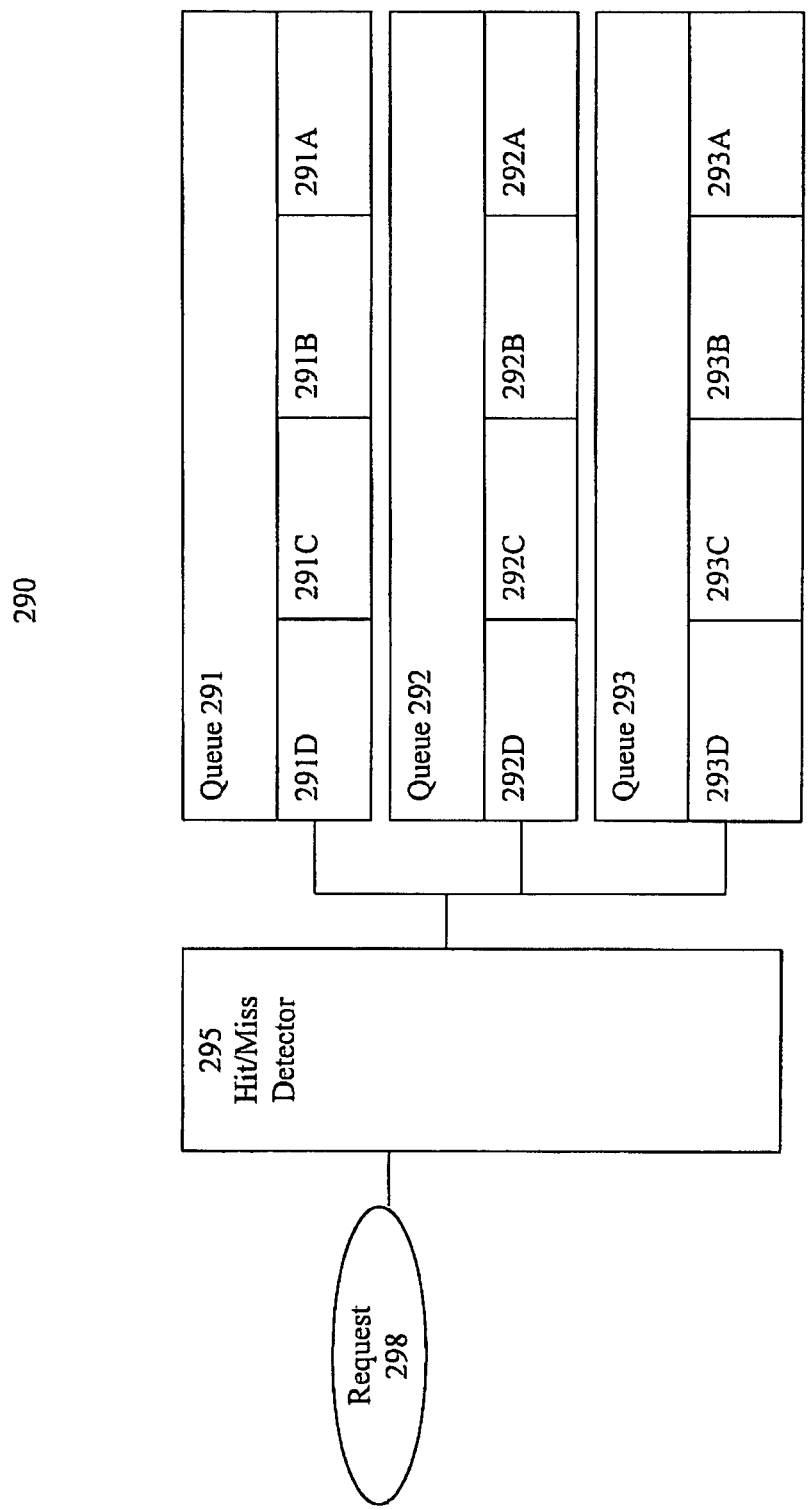
FIG. 2B is a block diagram of an exemplary age based request processing system in accordance with one embodiment of the present invention.

FIG. 2B is a block diagram of an age based request processing system 290 in accordance with one embodiment of the present invention. Age based processing system 290 includes hit/miss detector 295, queue 291, queue 292 and queue 293. Queues 291, 292 and 293 include slots A through D respectively. Each slot is capable of tracking a number of requests. Inside the MMU there are requests coming in and they go through a hit/miss detector 295 or cache lookup. If the request is a hit it continues processing and goes into a separate queue for hits. If the request is a miss it gets allocated a new slot and goes into a queue corresponding to this slot. The queues are organized according to the way in which the requests are hit in cache. Once a PTE is retrieved it corresponds to one of the ways. In one embodiment, all the requests are replayable in that particular queue. They are queued according to the way they were hit, not the way they came in. In the cache there are different slots in which the MMU stores PTEs that have been fetched before and they are called ways. The way the misses are queued up is the way they were hit or miss and each queue corresponds to one PTE. When the TLB gets a PTE back in the cache whatever is waiting on the way becomes serviceable and everything in that queue becomes serviceable. In one exemplary implementation each line of the buffer corresponds to a PTE. Inside the queue the order is the same as they come in, so the request at the top of the queue is going to be the oldest. When the MMU chooses the order from within a queue there is no problem, it just goes from top to bottom. In one embodiment, there is coalescing support in which multiple queues could be waiting for different PTEs that could be coalesced together and once it gets one of them these multiple queues become serviceable.

There are times when multiple queues become serviceable from a single PTE fetch because of coalescing. It is also possible for multiple PTEs to come in back to back to make multiple queues available for replay. In one embodiment, a present age based mechanism compares the age of the head of each of the serviceable queues to see which one is the oldest. Whatever is the oldest goes out first, it just compares the age of the head of the queue but there is a latency to do the comparison.

For example, if a comparison is performed between queue 292 and queue 293 and the oldest is the item 292A at the head of queue 292, then queue 292 is serviced. While the item 293A that is the head of queue 293 may become the oldest after servicing the queue 292A item, there is typically not enough time to perform the comparison between the head of queue 293 and new head of queue 292 so that comparison is really done in a lazy motor where the next item 292B in queue 292 is just treated as the oldest and is serviced. After doing the first comparison it goes back and does the second comparison and when it does the second comparison it cannot use the first comparison result because it is not available yet so it just keeps replaying until it gets the result. In one embodiment, three of them are replayed and then the head of another queue becomes the oldest and it switches to that queue. There is some coarse granularity in this process.

Figure 3:
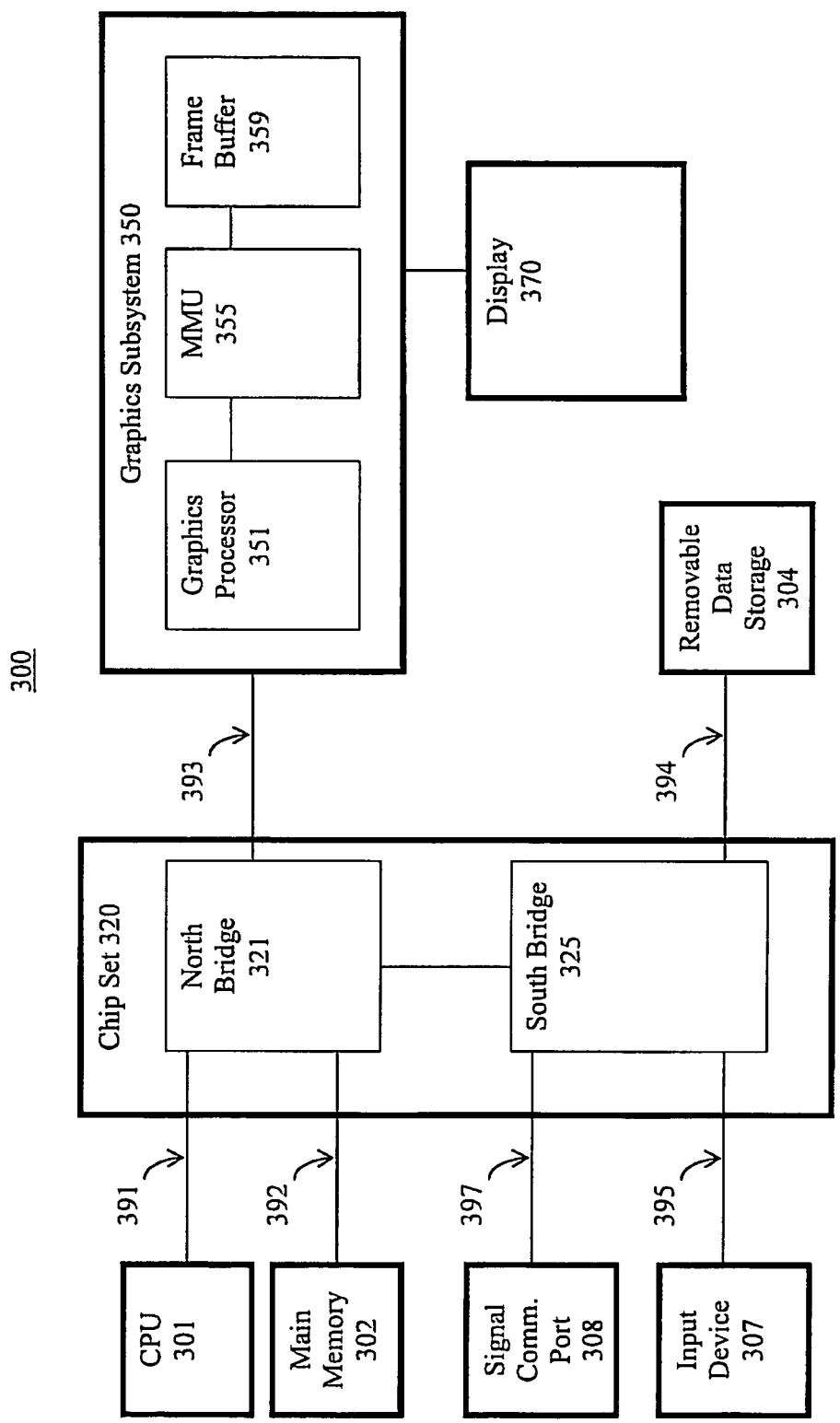
FIG. 3 is a block diagram of a computer system, one embodiment of a computer system upon which embodiments of the present invention can be implemented.

FIG. 3 is a block diagram of a computer system 300, one embodiment of a computer system upon which embodiments of the present invention can be implemented. Computer system 300 includes central processor unit 301, main memory 302 (e.g., random access memory), chip set 320 with north bridge 321 and south bridge 325, removable data storage device 304, input device 307, signal communications port 308, and graphics subsystem 350 which is coupled to display 370. Computer system 300 includes several busses for communicatively coupling the components of computer system 300. Communication bus 391 (e.g., a front side bus) couples north bridge 321 of chipset 320 to central processor unit 301. Communication bus 392 (e.g., a main memory bus) couples north bridge 321 of chipset 320 to main memory 302. Communication bus 393 (e.g., the Advanced Graphics Port interface) couples north bridge of chipset 320 to graphic subsystem 350. Communication buses 394-397 (e.g., a PCI bus) couple south bridge 325 of chip set 320 to removable data storage device 304, input device 307, signal communications port 308 respectively. Graphics subsystem 350 includes graphics processor 351, memory management unit 355 and graphics buffer 359.

The components of computer system 300 cooperatively operate to perform a variety of processing tasks and facilitate efficient memory accesses. Communications bus 391, 392, 393, 394, 395 and 397 communicate information. Central processor 301 processes information. Main memory 302 stores information and instructions for the central processor 301. Removable data storage device 304 also stores information and instructions (e.g., functioning as a large information reservoir). Input device 307 provides a mechanism for inputting information and/or for pointing to or highlighting information on display 370. Signal communication port 308 provides a communication interface to exterior devices (e.g., an interface with a network). Display device 370 displays information in accordance with data stored in frame buffer 359. Graphics processor 351 processes graphics commands from central processor 301 and provides the resulting data to graphics buffers 359 for storage and retrieval by display monitor 370. Memory management unit 355 handles the memory access requests between graphics processor 351 and graphics buffers 359. In one embodiment, memory management unit 355 is similar to memory management unit 200. It is appreciated that similar memory management units can be implemented to facilitate efficient and independent access requests to other memory components of computer system 300, including main memory 302 and bulk data storage 304.

It is appreciated that the present invention can be implemented in a variety of embodiments. In one exemplary implementation the present invention can be utilized in processing systems utilized to provide a variety of graphics applications including video games. For example, the present invention can be utilized to facilitate virtual address to physical address translations in a game console, personal computer, personal digital assistant, cell phone or any number of platforms for implementing a video game. It is also appreciated that references to video game application implementations are exemplary and the present invention is not limited to these implementations.

Figure 4:
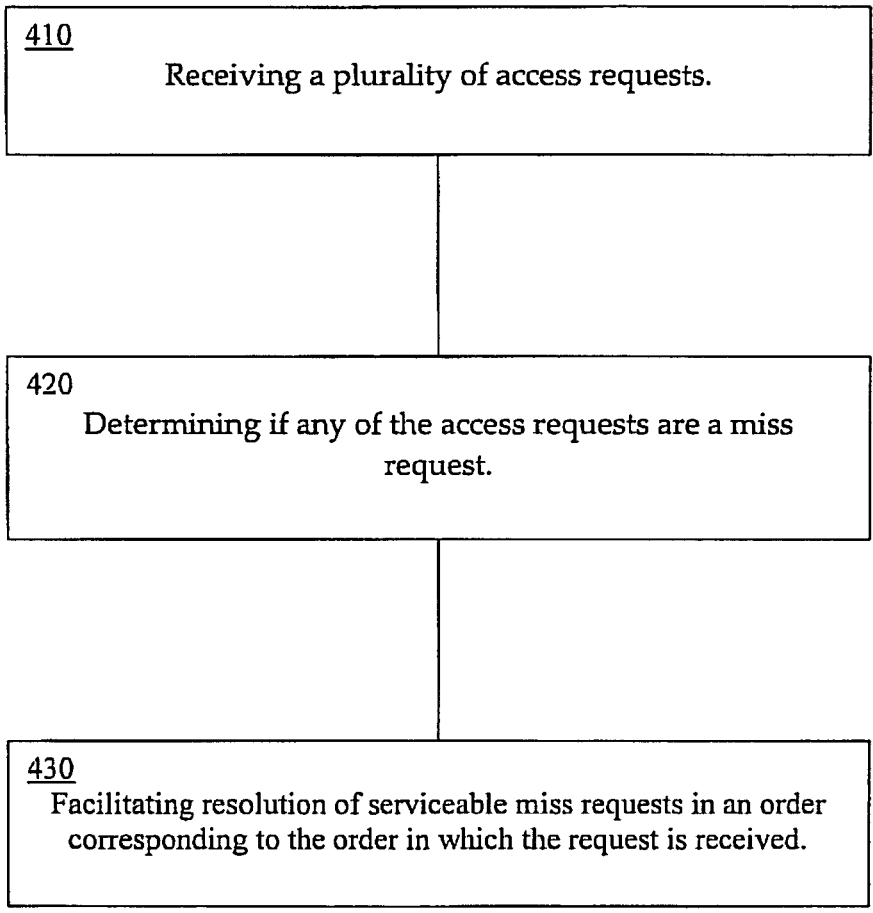
FIG. 4 is a flow chart of an exemplary memory management method in accordance with one embodiment of the present invention.

FIG. 4 is a flow chart of an exemplary memory management method 400 in accordance with one embodiment of the present invention. Memory management method 400 facilitates efficient and independent memory access fault recovery.

At block 410, a plurality of access requests are received. In one embodiment, the plurality of access requests are from a plurality of clients. It is appreciated the access requests can be directed to various MMU units. In one embodiment, level 1 translation cache memory units (e.g., micro TLB, Hub TLB, etc.) receive access requests and after MMU translation the request has an aperture field which notifies a frame buffer interface which destination the request should be forwarded to (e.g., frame buffer memory, dedicated memory, main system memory, etc.). One of the pluralities of access requests can be from a first engine and another one of the plurality of access requests can be from a second engine.

A determination is made if any of the access requests are miss request at block 420. In one embodiment the miss under miss requests are queued up. An age is assigned to each request.

In block 430, resolution of serviceable miss requests in an order corresponding to the order in which the request is received. In one embodiment requests at a head of serviceable queues are compared to identify the oldest. In one exemplary implementation the comparing includes examining an age tag. The next serviceable request in a queue are forwarded while performing a comparison.

Figure 5:
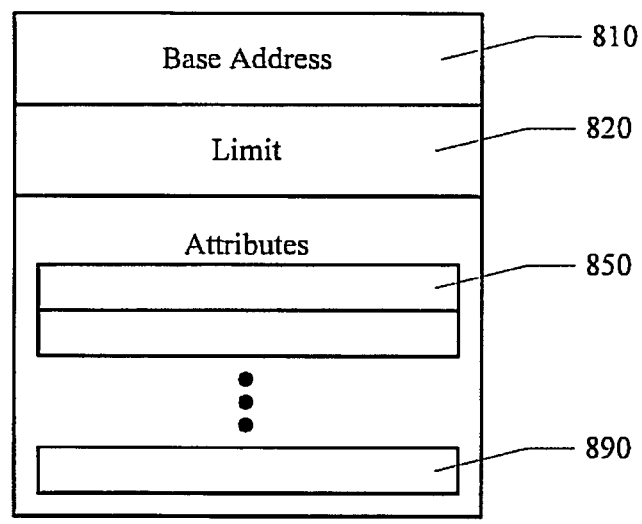
FIG. 5 is a block diagram illustration of an exemplary context specifier in accordance with one embodiment of the present invention.

Referring now to FIG. 5, a block diagram illustration of a context specifier 800, in accordance with one embodiment of the present invention, is shown. The context specifier 800 is a data structure that stores a base address 810, a limit 820, and one or more attributes 850, 890, etc.

Figure 6:
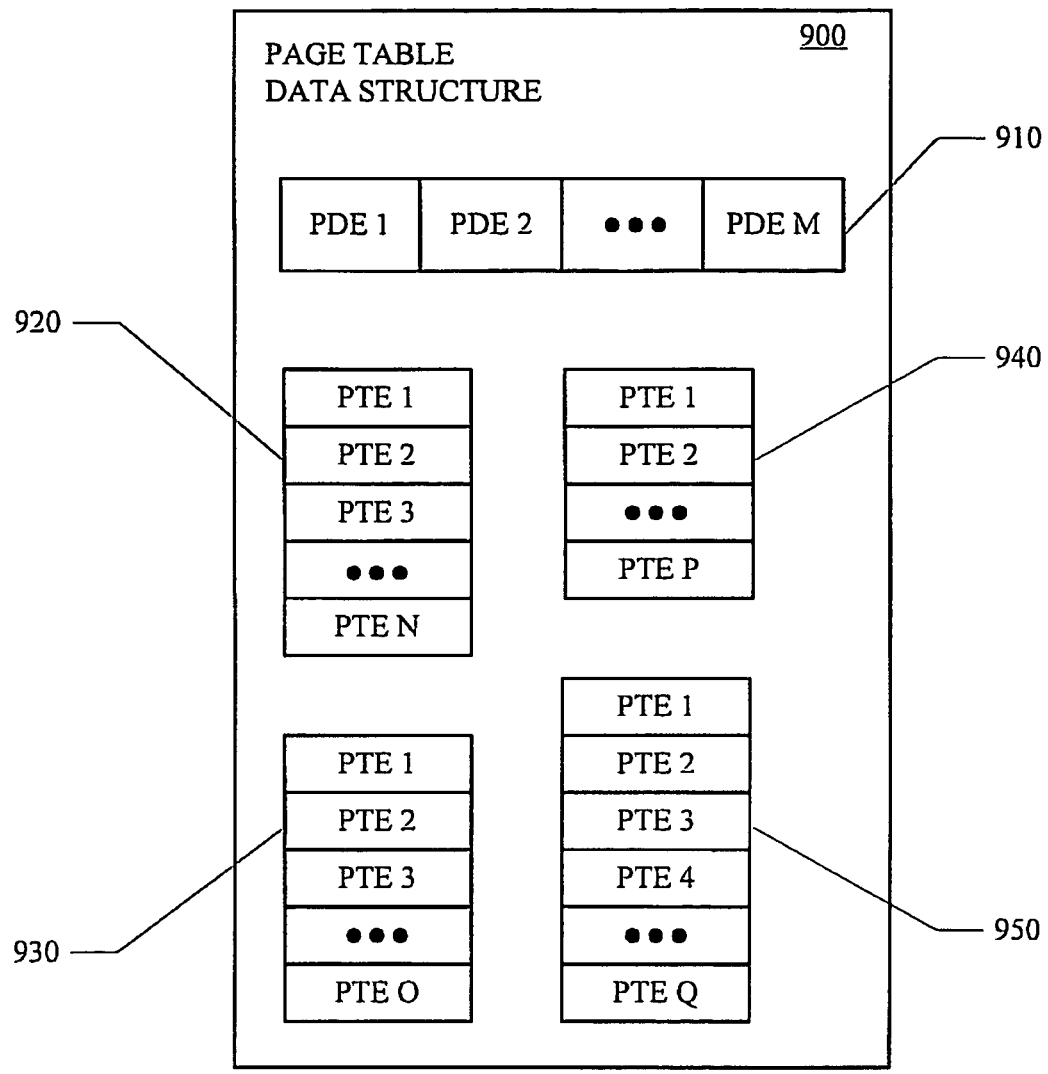
FIG. 6 is a block diagram of an exemplary page table data structure in accordance with one embodiment of the present invention.

FIG. 6 is a block diagram of an exemplary page table data structure 900 in accordance with one embodiment of the present invention. The illustrated two-level page table data structure 900 may include a page directory 910 and one or more page tables 920-950. The page directory 910 includes a plurality of page directory entries (PDE). Each PDE includes the address of a corresponding page table 920-950. Each PDE may also include a plurality of attributes. Each page table 920-950 includes one or more page table entries (PTE). Each PTE includes a corresponding frame number (e.g., physical page number). Each PTE may also include a plurality of attributes such as a dirty bit, an accessed bit, a page check disable bit, a page write transparent bit, a user accessible bit, a writeable bit, a present bit, a referenced bit, a hash function identification bit, a valid bit, an address compare bit, a changed bit, storage control bits, a no execute bit, page protection bits and/or the like. One or more of the attributes in the PDE and/or PTE may be the same attributes contained in the context specifier 800. For example, in one implementation, the attributes in the context specifier includes all of the attributes in the PTEs.

Figure 7:
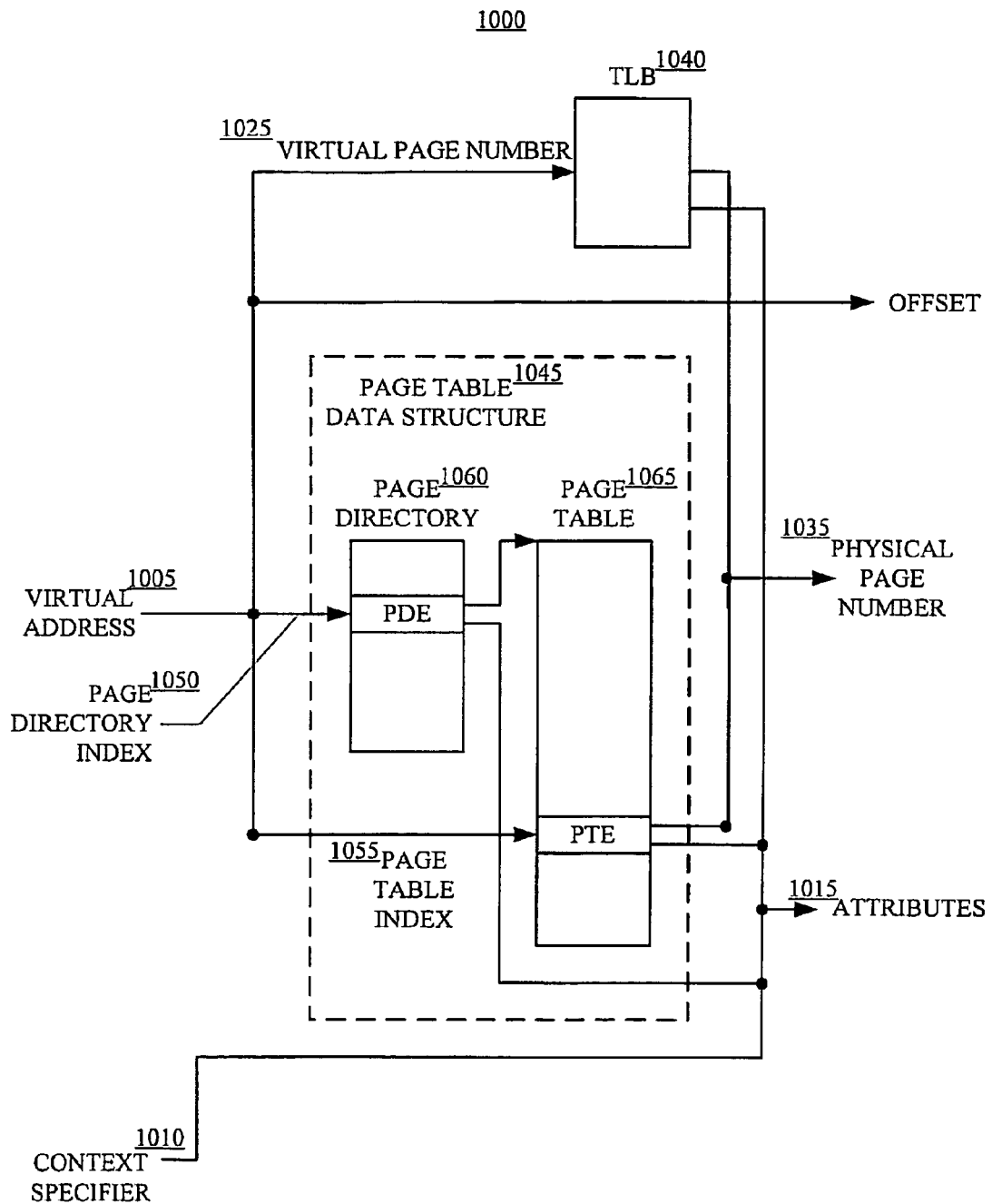
FIG. 7 is a block diagram of an exemplary system for translating virtual addresses to physical addresses in accordance with one embodiment of the present invention.

With reference now to FIG. 7, a block diagram of an exemplary system for translating virtual addresses to physical addresses in accordance with one embodiment of the present invention is shown. In one exemplary implementation, a virtual address 1005 and a context specifier 1010 are received. The context specifier 1010 includes one or more attributes 1015. The virtual address 1005 includes a virtual page number.

In one exemplary implementation, the virtual address 1050 is translated using a page table data structure 1045 which may be cached in TLB 1040. In particular, if a TLB 1040 includes a valid virtual-to-physical page mapping for the virtual page number 1025 (e.g., TLB hit) the appropriate physical page number 1035 is output from the TLB 1040. When the virtual page number 1025 is mapped to a given physical page number 1035 using the TLB 1040, the attributes used in the address translation process and/or output for use in accessing the memory may use attributes 1015 contained in the TLB 1040 or attributes of the context specifier 1010.

However, if the TLB 1040 does not include a valid mapping (e.g., TLB miss), the virtual address 1005 is translated using a page table data structure 1045. More specifically, the virtual page number 1025 includes a page directory index 1050 and a page table index 1055. The page directory index 1050 in the virtual address 1005 is used to index a given page directory 1060. The page directory entry (PDE) indexed by the page directory index 1050 includes an address of a given page table 1065. The page table index 1055 in the virtual address 1005 is used to index the given page table 1065 located at the address specified in the PDE. The page table entry (PTE) indexed by the page table index 1055 includes the physical page number 1035. When the virtual page number is translated to a given physical page number 1035 using the page table data structure 1045, the attributes 1015 used in the address translation process and/or output for use in accessing the memory may be attributes 1015 specified in the given PDE and/or PTE, or attributes 1015 of the context specifier 1010.

In one embodiment, the present invention includes a page table entry override capability. If the page table entry override capability is engaged an adjustment in the attributes of a context specifier is utilized in determining the physical page number.

It is appreciated, embodiments of the present invention can facilitate virtual address translation to physical addresses of information located in a variety of memory types including a frame buffer memory, dedicated memory, main system memory, and etcetera.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A shared resource management system comprising:
a plurality of engines for performing processing;
a memory for supporting said processing; and
a memory management unit for handling multiple outstanding miss requests, wherein said memory management unit includes a plurality of queues and said memory management unit performs an age comparison between requests at the head of respective queues in said plurality of queues.

2. A shared resource management system of claim 1 wherein said memory management unit services said multiple outstanding miss requests in accordance with an order in which they are serviceable and received.

3. A shared resource management system of claim 1 wherein said memory management unit compares ages of serviceable requests and services the oldest request.

4. A shared resource management system of claim 1 wherein said memory management unit tags each request with an age when it is received.

5. A shared resource management system of claim 1 wherein said memory management unit forwards fill requests while performing subsequent comparisons.

6. A shared resource management system of claim 5 wherein said memory management unit facilitates contiguous page coalescing.

7. A memory management method comprising:
receiving a plurality of access requests;
determining if any of said access requests are a miss request;
tracking said access requests with a plurality of queues;
facilitating resolution of serviceable miss requests in an order corresponding to the order in which said serviceable miss requests are received, wherein a request becomes serviceable miss request when a translation look aside buffer gets a page table entry back in cache; and
performing an age comparison between requests at the head of respective queues in said plurality of queues.

8. A memory management method of claim 7 further comprising queuing up said serviceable miss requests.

9. A memory management method of claim 7 further comprising comparing requests at a head of serviceable queues to identify the oldest request.

10. A memory management method of claim wherein said comparing includes examining an age tag.

11. A memory management method of claim 10 further comprising assigning an age to each request.

12. A memory management method of claim 10 further comprising forwarding a next serviceable request in a queue while performing a comparison.

13. A memory management method of claim 10 further comprising comparing requests at a head of serviceable queues to identify the oldest request.

14. A memory management component comprising:
- a shared translation lookaside buffer for translating virtual address to physical addresses, including assigning ages to each received memory access request;
- a plurality of queues for storing requests and an age comparison is performed between requests at the head of respective queues in said plurality of queues; and
- a fill component for coordinating multiple miss memory access requests.

15. A memory management component of claim 14 wherein said memory management component assigns ages to said miss memory access requests.

16. A memory management component of claim 14 wherein said ages correspond to the order in which said miss memory access requests are received.

17. A memory management component of claim 14 wherein multiple miss requests in a queue are replayable together.

18. A memory management component of claim 17 wherein a request has a priority field and serviceable requests with the highest priority go out first even though one of assigned ages to said serviceable requests with the highest priority may not be the oldest.

19. A memory management component of claim 14 wherein said fill component performs a comparison of serviceable miss queues.

* * * * *